(12) United States Patent
Metzler et al.

(10) Patent No.: US 9,825,445 B2
(45) Date of Patent: Nov. 21, 2017

(54) STRAIN/VIBRATION RELIEVING CABLE HOUSING DEVICE

(71) Applicant: Kostal Kontakt Systeme GmbH, Luedenscheid (DE)

(72) Inventors: Markus Metzler, Iserlohn (DE); Michael Schricker, Luedenscheid (DE)

(73) Assignee: Kostal Kontakt Systeme GmbH, Luedenscheid (DE)

( * ) Notice: Subject to any disclaimer, the term of this patent is extended or adjusted under 35 U.S.C. 154(b) by 0 days.

(21) Appl. No.: 15/359,812

(22) Filed: Nov. 23, 2016

(65) Prior Publication Data

US 2017/0077688 A1 Mar. 16, 2017

Related U.S. Application Data

(63) Continuation of application No. PCT/EP2015/062164, filed on Jun. 1, 2015.

(30) Foreign Application Priority Data

Jun. 4, 2014 (DE) .......................... 10 2014 008 343

(51) Int. Cl.
  *H02G 3/08* (2006.01)
  *H01R 13/424* (2006.01)
  *H01R 13/506* (2006.01)

(52) U.S. Cl.
  CPC ........... *H02G 3/083* (2013.01); *H01R 13/424* (2013.01); *H01R 13/506* (2013.01); *H02G 3/088* (2013.01)

(58) Field of Classification Search
  None
  See application file for complete search history.

(56) References Cited

U.S. PATENT DOCUMENTS

| 4,191,443 A | * | 3/1980 | Doyle | ................. H01R 13/506 439/462 |
| 5,234,355 A | * | 8/1993 | Sosinski | .............. H01R 13/213 439/337 |
| 5,257,763 A | | 11/1993 | Nakamura | |

(Continued)

FOREIGN PATENT DOCUMENTS

| AT | 395084 B | 9/1992 |
| DE | 10135971 C1 | 4/2003 |

(Continued)

OTHER PUBLICATIONS

The International Bureau of WIPO, International Preliminary Report on Patentability for International Application No. PCT/EP2015/062164, dated Dec. 15, 2016.

(Continued)

*Primary Examiner* — Dimary Lopez Cruz
*Assistant Examiner* — Muhammed Azam
(74) *Attorney, Agent, or Firm* — Brooks Kushman P.C.

(57) ABSTRACT

An electric device includes a housing and a clamp. The housing has a port through which a cable is led. The clamp has inter-connectable first and second clamping bodies. Each clamping body has clamping ribs. The clamping bodies are interconnected to one another causing the clamping ribs to interlock with one another around the cable to thereby fix the clamp to the cable. The clamp is situated at an opening of the port with the clamping bodies being within the port and the clamp is fastened to the housing.

20 Claims, 5 Drawing Sheets

(56) References Cited

U.S. PATENT DOCUMENTS

| | | | | |
|---|---|---|---|---|
| 5,866,853 | A | * | 2/1999 | Sheehan ............... H02G 3/0675 174/153 R |
| 6,034,329 | A | * | 3/2000 | Kawamura ......... B60R 16/0215 138/162 |
| 6,323,431 | B1 | * | 11/2001 | Lin ........................ H01R 13/72 174/135 |
| 6,425,776 | B1 | * | 7/2002 | Fredl ...................... H01R 13/59 439/320 |
| 8,124,887 | B2 | * | 2/2012 | Suzuki ................ B60R 16/0215 174/481 |
| 9,160,082 | B2 | * | 10/2015 | Heringhaus .......... H01R 13/187 |
| 9,209,553 | B2 | * | 12/2015 | Rimke ................. H01R 13/506 |
| 9,287,647 | B2 | * | 3/2016 | Swoboda .............. H01R 13/193 |
| 9,337,569 | B2 | * | 5/2016 | Kindermann ........... H01R 13/41 |
| 9,595,783 | B2 | * | 3/2017 | Pitzul ................... H01R 13/521 |
| 9,647,371 | B2 | * | 5/2017 | Thurau ................. H01R 13/436 |
| 2003/0060084 | A1 | * | 3/2003 | Aoki ...................... H01R 9/032 439/607.41 |
| 2004/0014367 | A1 | * | 1/2004 | Petersen .............. H01R 13/514 439/669 |
| 2009/0101761 | A1 | | 4/2009 | Hammerstingl et al. |
| 2010/0108375 | A1 | | 5/2010 | Richter |
| 2011/0210222 | A1 | * | 9/2011 | Van Walraven .......... F16L 5/04 248/315 |
| 2011/0294324 | A1 | | 12/2011 | Bihrer et al. |
| 2012/0021632 | A1 | * | 1/2012 | Matsumoto .......... H01R 13/506 439/271 |
| 2012/0034817 | A1 | | 2/2012 | Plate et al. |
| 2012/0292098 | A1 | | 11/2012 | Kinzl et al. |
| 2013/0017714 | A1 | * | 1/2013 | Kao ..................... H01R 13/506 439/460 |
| 2016/0315414 | A1 | * | 10/2016 | Defibaugh ........... H01R 13/582 |
| 2017/0077688 | A1 | * | 3/2017 | Metzler ................. H02G 3/088 |

FOREIGN PATENT DOCUMENTS

| | | |
|---|---|---|
| DE | 102008022055 A1 | 11/2009 |
| DE | 102008052822 A1 | 4/2010 |
| DE | 102010007093 A1 | 8/2011 |
| EP | 2051337 A2 | 4/2009 |
| EP | 2849299 A2 | 3/2015 |

OTHER PUBLICATIONS

European Patent Office, International Search Report for the corresponding International Application No. PCT/EP2015/062164, dated Dec. 9, 2015.

German Patent and Trademark Office, German Search Report for the corresponding German Patent Application No. 10 2014 008 343.8 dated May 12, 2015.

* cited by examiner

STRAIN/VIBRATION RELIEVING CABLE HOUSING DEVICE

CROSS-REFERENCE TO RELATED APPLICATIONS

This application is a continuation of International Application No. PCT/EP2015/062164, published in German, with an International filing date of Jun. 1, 2015, which claims priority to DE 10 2014 008 343.8, filed Jun. 4, 2014, the disclosures of which are hereby incorporated in their entirety by reference herein.

TECHNICAL FIELD

The present invention relates to an electric device having a housing and a clamp, the housing includes a port through which a cable is guided into the housing, and the clamp is arranged on the port, fixed to the cable, and fastened to the housing.

BACKGROUND

Electric devices not having a built-in power supply generally have at least one electrical connecting line (e.g., at least one cable). A cable may be connected via an electrical plug-in connection to a housing of an electric device or led through an opening of the housing into the interior of the housing to contact internal device components. In the latter case, the cable should be secured to the housing so that the electrical connection does not become destroyed by low tensile forces acting on the cable. The means and arrangements used for this purpose are generally referred to as strain relief devices. The phrase "electric device" (or "electrical device") is to be understood to include outlets such as connection sockets and connectors such as plug-in connectors.

The functional principle of strain relief for a connecting line is generally based on fixing the connecting line in a clamping manner by joining together housing parts or by tightening a mechanical fastener (e.g., screw) connection to the housing.

In many cases, the housing of an electric device is made up of two joinable parts. After being joined together the joinable parts clamp the connection line between them at a location designated for this purpose. However, this type of strain relief does not function properly when the connection line to be fastened to the housing is a rigid cable having a relatively large cross section. In particular, when multiple cables are to be attached to the housing it is advantageous to provide fastening means particularly suited for this purpose.

DE 10 2010 007 093 A1 (corresponding to U.S. Publication No. 2012/0292098) describes an electric device having a cable feedthrough through a housing wall. A connection socket, in particular for a photovoltaic system, having two cable inlet ports is integrally formed on the housing. Relatively rigid, shielded, high-voltage cables are led into the interior of the housing respectively through the cable inlet ports. Each cable is fastened by crimping a sleeve on the outer sheathing of the cable. An annular surface on the sleeve is placed against the end face of the corresponding cable inlet port and is fastened by a union nut screwable onto the cable inlet port.

Establishing this type of cable fastening involves a relatively high level of assembly effort. This is due to the crimping operation initially carried out followed by the comparatively large time expenditure for subsequently establishing the screw connection. Therefore, such a design has limited suitability for electric devices manufactured in large amounts and to which multiple cables are to be fastened.

SUMMARY

An object is an electric device having one or more cable inlet ports to which one or more cables may be fixed respectively to in a particularly simple, rapid, reliable, and cost-effective manner.

In carrying out at least one of the above and/or other objects, an electric device is provided. The electric device includes a housing and a clamp. The housing has a port through which a cable is led. The clamp has inter-connectable first and second clamping bodies. Each clamping body has clamping ribs. The clamping bodies are interconnected to one another causing the clamping ribs to interlock with one another around the cable to thereby fix the clamp to the cable. The clamp is situated at an opening of the port with the clamping bodies being within the port and the clamp is fastened to the housing.

Further, in carrying out at least one of the above and/or other objects, another electric device is provided. This electric device also includes a housing and a clamp. The housing has mutually parallel ports through which cables are respectively led into an interior of the housing. The clamp has inter-connectable first and second clamping bodies. Each clamping body has clamping ribs. The clamping bodies are interconnected to one another causing the clamping ribs to interlock with one another around the cables to thereby fix the clamp to the cables. The clamp is situated at openings of the ports with the clamping bodies being within the ports and the clamp is fastened to the housing.

An embodiment provides an electric device having a housing and a clamping device. The housing includes one or more integrally formed cable inlet ports (e.g., openings). For example, the housing includes multiple integrally formed cable inlet openings. Cables are respectively guided through the cable inlet openings into the interior of the housing. The clamping device is arranged on the cable inlet openings, secured to the housing, and fixed to the cables respectively guided through the cable inlet openings.

The clamping device includes first and second inter-connectable clamping bodies. Each clamping body includes multiple integrally formed clamping ribs. The clamping ribs of the first clamping body cross over or intertwine with the clamping ribs of the second clamping body when the clamping bodies are interconnected. The clamping bodies inter-connect for the clamping device to be arranged on the cable inlet openings and fixed to the cables guided through the cable inlet openings. Each clamping body further includes corresponding engaging or connecting means such as in the form of mechanical detent portions. The detent portions of the clamping bodies engage or connect with one another when the clamping bodies are interconnected. The engagement or connection between the detent portions of the clamping bodies secures the clamping device arranged on the cable inlet openings to the cable inlet openings.

In embodiments, the clamping device includes two inter-connectable clamping members (e.g., bodies). Each clamping body has multiple integrally formed clamping ribs. The clamping ribs of one clamping body intertwine or lock with the clamping ribs of the other clamping body when the clamping bodies are interconnected. The clamping device is arranged or situated at the inlet opening of the at least one cable inlet connection, fastened to the at least one cable inlet connection by the engagement of engaging means of the clamping bodies or by the connection of connection means of the clamping bodies, and fixed to the housing by detent means.

An electric device in accordance with the embodiments allows one or more cables to be relatively quickly fastened to a housing of the electric device with relatively little effort and with strain relief and protection from vibrations. Such cables may be cables that are relatively rigid and have a large cross section.

BRIEF DESCRIPTION OF THE DRAWINGS

Two exemplary embodiments of an electric device are explained in greater detail below with reference to the drawings, which show the following.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
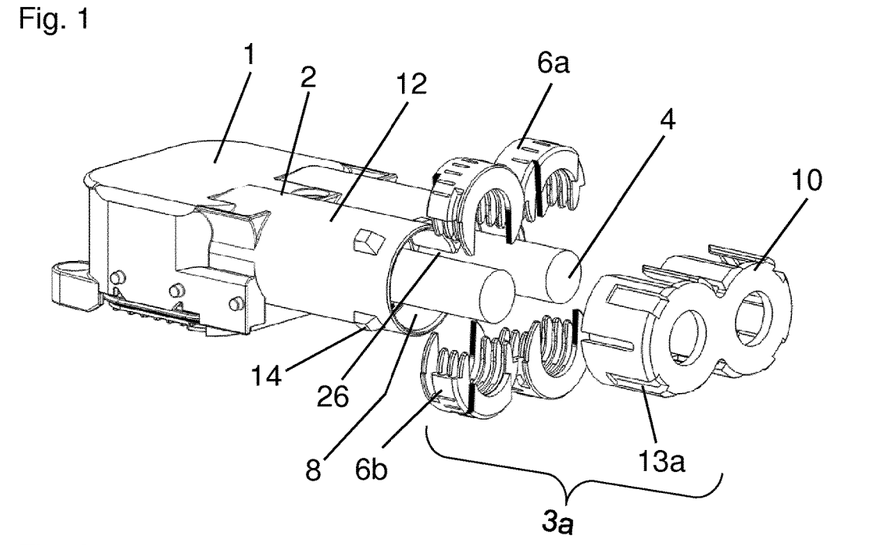
FIG. 1 illustrates a disassembled view of an electric device in accordance with a first exemplary embodiment.
Figure 2:
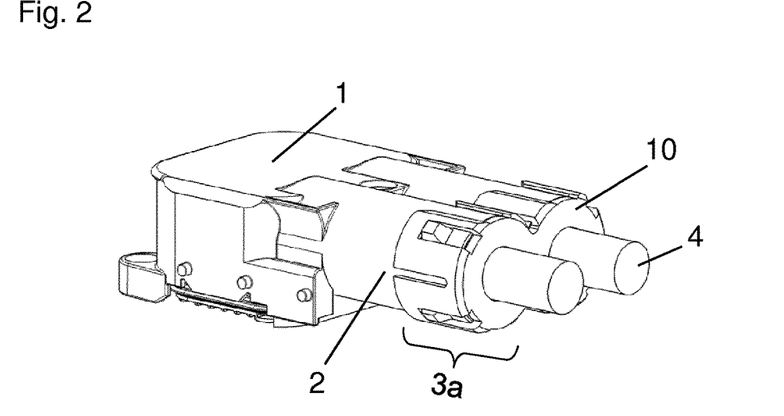
FIG. 2 illustrates an assembled view of the electric device in accordance with the first embodiment.

Referring now to FIGS. 1 and 2, an electric device in accordance with a first exemplary embodiment is shown. FIG. 1 illustrates a disassembled view of the electric device and FIG. 2 illustrates an assembled view of the electric device. As is apparent from the sectional view in FIG. 10, the electric device forms by way of example a plug-in connector part for high-voltage electrical connections. However, the electric device may be provided for some other function, and in particular may contain various electrical and/or electronic components.

The electric device includes a housing 1 and a clamping device 3a. Housing 1 has integrally formed cable inlet ports 2. Cable inlet ports 2 are situated in parallel to one another. Cables 4 may be respectively led through cable inlet ports 2 into the interior of housing 1. In the two exemplary embodiments of the electric device illustrated in the Figures, housing 1 is illustrated in each case with two mutually parallel cable inlet ports 2. This amount of cable inlet ports 2 is an example and is not limiting to the design possibilities of the electric device. Further, cable inlet ports 2 are illustrated as having a circular cross-section. However, cable inlet ports 2 may have other cross-sectional shapes such as oval or polygonal.

As shown in FIGS. 1 and 2, cables 4 are led into housing 1 respectively through cable inlet ports 2. Cables 4 are fastened to respective cable inlet ports 2 in a vibration-proof manner and with protection against acting tensile forces to thereby achieve reliable functioning of the electric device. This fastening of cables 4 to cable inlet ports 2 is achieved by clamping device 3a.

Clamping device 3a is a three-part clamping device including a first clamping body 6a, a second clamping body 6b, and a retaining cap 10. First and second clamping bodies 6a and 6b are inter-connectable with one another. Clamping bodies 6a and 6b are shown in FIG. 1 in the form of cable claws.

Figure 5:
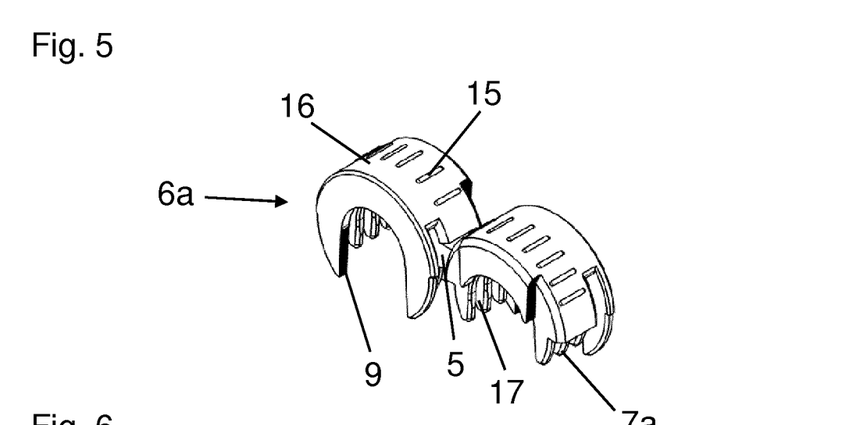
FIG. 5 illustrates a first clamping body of a clamping device of the electric device in accordance with the first embodiment.
Figure 6:
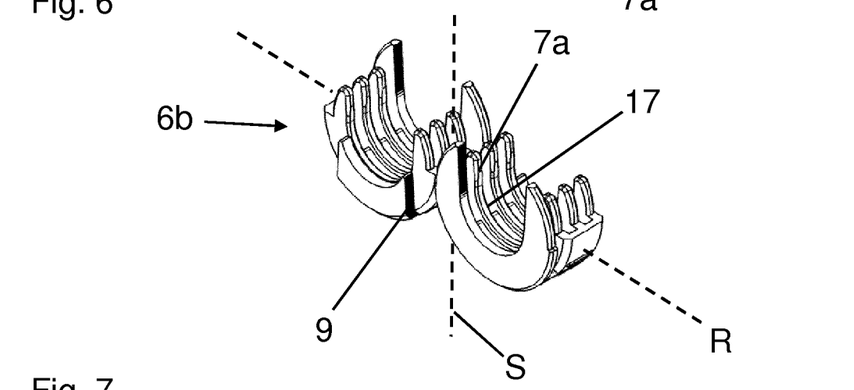
FIG. 6 illustrates a second clamping body of the clamping device of the electric device in accordance with the first embodiment.
Figure 7:
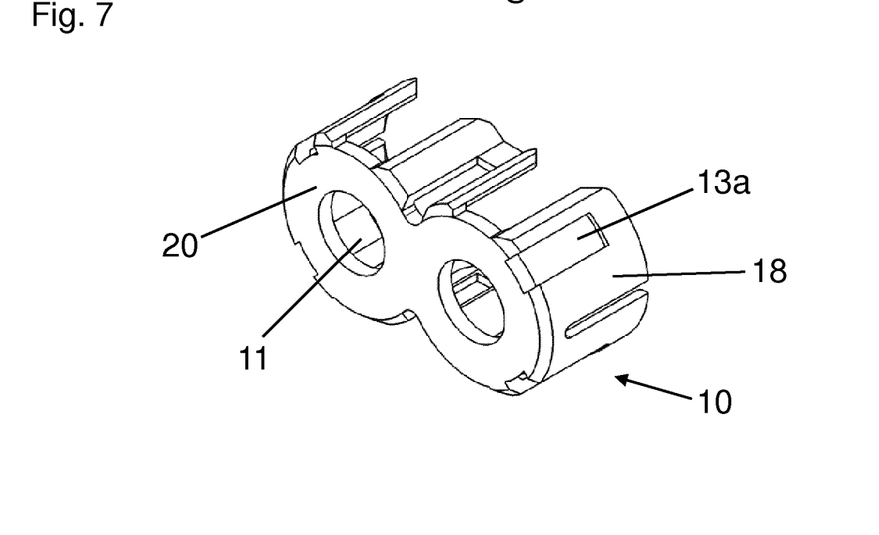
FIG. 7 illustrates a retaining cap of the clamping device of the electric device in accordance with the first embodiment.

FIGS. 5, 6, and 7 respectively illustrate first clamping body 6a, second clamping body 6b, and retaining cap 10 as individual parts. As shown in FIGS. 5 and 6, first clamping body 6a is a unitary structure having two clamping body portions 16 and second clamping body 6b is a unitary structure having two clamping body portions 16. Each clamping body portion 16 has a half-ring-shaped cross-section (e.g., each clamping body portion 16 is semi-annular).

Clamping body portions 16 of first clamping body 6a are connected to one another via a connecting web 5 of first clamping body 6a. Clamping body portions 16 of second clamping body 6b are connected to one another via a connecting web 5 of second clamping body 6b.

Each clamping body portion 16 includes a plurality of contact ribs 15. Contact ribs 15 are integrally formed on the outer sides of clamping body portions 16. Contact ribs 15 are mutually parallel with one another. Contact ribs 15 of clamping body portions 16 of first clamping device 3a assist with a play-free seating of the clamping body portions of the first clamping device within respective cable inlet ports 2 when the first clamping device is received within the cable inlet ports while the electric device is assembled. Similarly, contact ribs 15 of clamping body portions 16 of second clamping device 3b assist with a play-free seating of the clamping body portions of the second clamping device within respective cable inlet ports 2 when the second clamping device is received within the cable inlet ports while the electric device is assembled.

The two semi-annular clamping body portions 16 of first clamping body 6a and the two semi-annular clamping body portions 16 of second clamping body 6b complement one another to form two full-annular clamping body portions when first and second clamping bodies 6a and 6b are joined together.

First clamping body 6a further includes a first set of arch-shaped clamping ribs 7a and second clamping body 6a further includes a second set of arch-shaped clamping ribs 7a. Clamping ribs 7a are situated in parallel to one another and are separated by gaps 17. When clamping bodies 6a and 6b are joined together, clamping ribs 7a of first clamping body 6a fit into gaps 17 of second clamping body 6b and clamping ribs 7a of second clamping body 6b fit into gaps 17 of first clamping body 6a thus forming an interlocked arrangement of clamping ribs 7a.

Advantageously, the two clamping bodies 6a and 6b which are joinable in this way may have an identical design. With an identical design when second clamping body 6b illustrated in FIG. 6 is rotated by 180° about the rotation axis R depicted by a dashed line, first clamping body 6a according to FIG. 5 is obtained. FIGS. 5 and 6 thus show the same type of clamping body from different perspectives. Since first and second clamping bodies 6a and 6b having different designs are not needed for producing clamping device 3a, clamping bodies 6a and 6b may be manufactured in large numbers as cost-effective identical parts.

First and second clamping bodies 6a and 6b may also have a design that is axially symmetrical with respect to an axis of symmetry S depicted in FIG. 6. Rotating first clamping body 6a or second clamping body 6b by 180° about this axis of symmetry S once again results in the same visual appearance. This symmetry simplifies assembly, since the particular orientation does not have to be taken into account when clamping bodies 6a and 6b are joined together.

First and second clamping bodies 6a and 6b each include integrally formed engaging or connecting means such as in the form of inter-lockable mechanical detent portions 9 (e.g., micro-toothing). Detent portions 9 of first clamping body 6a and detent portions 9 of second clamping body 6b are on mutually contacting parts of clamping bodies 6a and 6b. Detent portions 9 are illustrated in a simplified manner by darkened surfaces in FIGS. 5 and 6. Detent portions 9 of first clamping body 6a connect with corresponding detent portions 9 of second clamping body 6b when the clamping bodies are joined with one another.

Detent portions 9 allow a connection of clamping bodies 6a and 6b in a virtually continuous sequence of locking steps. As a result of clamping bodies 6a and 6b being joined together with detent portions 9 of the clamping bodies being connected with one another, clamping bodies 6a and 6b tightly press against cables 4 respectively extending through cable inlet ports 2. Consequently, clamping ribs 7a of clamping bodies 6a and 6b press into the sheathing material of cables 4.

The interconnected clamping bodies 6a and 6b, which are thus fixedly connected to cables 4, are then inserted together with the attached cables 4 into port openings 8 in cable inlet ports 2 in order to complete the assembly of the electric device. The interconnected clamping bodies 6a and 6b are inserted into and within port openings 8 in cable inlet ports 2 until the outer end faces of clamping bodies 6a and 6b end in flush alignment with the end-face edges of cable inlet ports 2. Connecting webs 5 between semi-annular portions 16 of clamping bodies 6a and 6b are hereby accommodated by a recess 26, apparent in FIG. 1, between cable inlet ports 2.

As shown in FIG. 7, retaining cap 10 of clamping device 3a is a one-piece retaining cap. Retaining cap 10 is used for fixing the extent mounted assembly once it is assembled. Retaining cap 10 has the shape of two cylindrical caps which are connected to one another along their side walls 18. An end-face wall 20 of retaining cap 10 has two cable feedthrough openings 11. The diameters of cable feedthrough openings 11 correspond to the cross-sectional width of cables 4. In addition to being led through cable inlet ports 2 of housing 1, cables 4 are to be respectively led through cable feedthrough openings 11 of retaining cap 10.

Retaining cap 10 includes a plurality of slotted detent recesses 13a on the outer sides of side walls 18 of the retaining cap 10.

To complete the assembly of the electric device, free end sections of cables 4 are led through cable feedthrough openings 11 of retaining cap 10. Retaining cap 10 is then pulled over cables 4 until the retaining cap is just in front of housing 1. After clamping bodies 6a and 6b are installed on cables 4 and clamping bodies 6a and 6b are inserted into cable inlet ports 2, side walls 18 of retaining cap 10 are pushed over the outer side of cable inlet ports 2. Side walls 18 of retaining cap 10 are pushed over the outer side of cable inlet ports 2 until locking tabs 14 integrally formed on the outer side of cable inlet ports 2 lock into detent recesses 13a in retaining cap 10. This results in the assembled state of the electric device as illustrated in FIG. 2. End-face wall 20 of retaining cap 10 now fixes clamping bodies 6a and 6b within cable inlet ports 2. Retaining cap 10 together with clamping bodies 6a and 6b thus forms clamping device 3a. Clamping device 3a fastens cables 4 to housing 1 with protection against tensile and vibration stresses.

The electric device in accordance with the first embodiment has thus been described with reference to FIGS. 1, 2, 5, 6, 7, and 10. The leading of cables 4 through cable feedthrough openings 11 in retaining cap 10 and the pushing of retaining cap 10 over the length of cables 4 during the assembly of the electric device may be relatively labor-intensive assembly steps.

Figure 3:
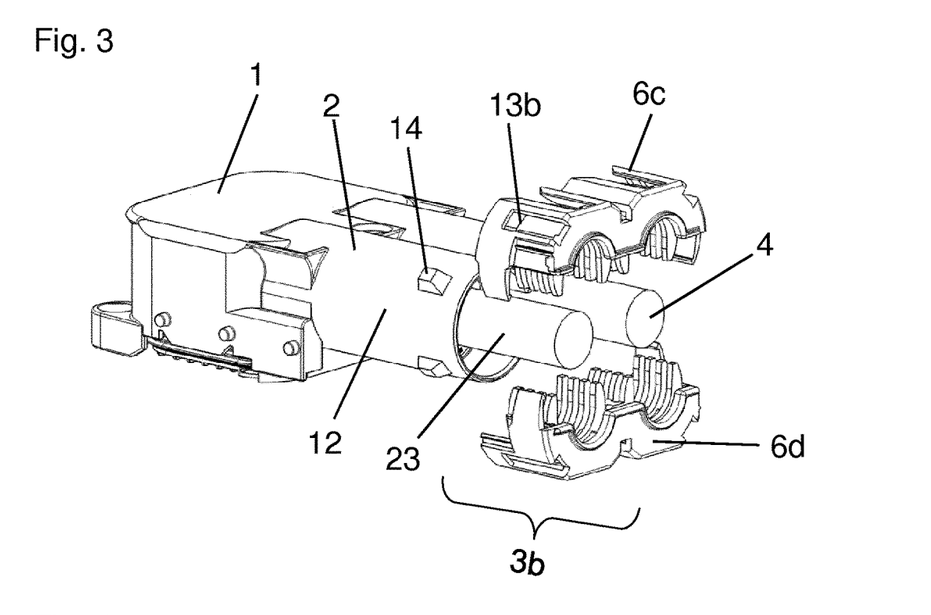
FIG. 3 illustrates a disassembled view of the electric device in accordance with a second exemplary embodiment.
Figure 4:
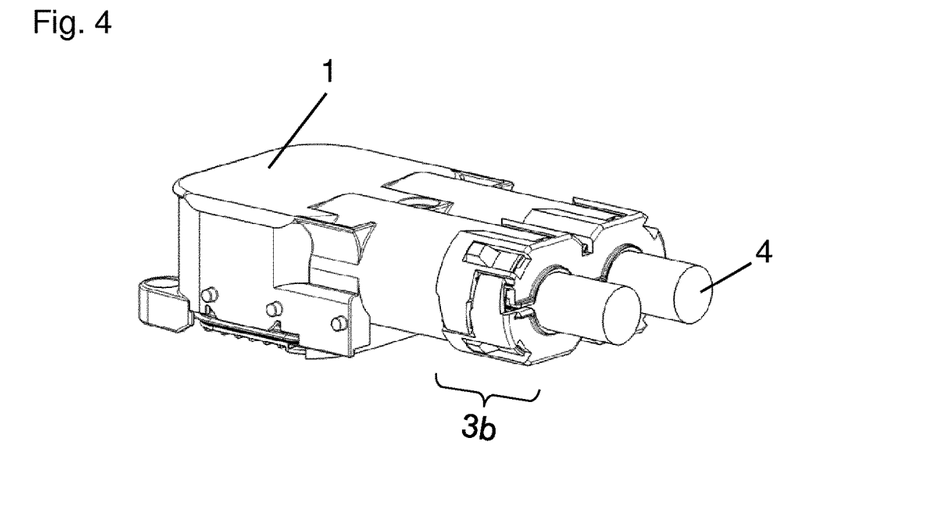
FIG. 4 illustrates an assembled view of the electric device in accordance with the second embodiment.

Referring now to FIGS. 3 and 4, an electric device in accordance with a second exemplary embodiment will be described. FIG. 3 illustrates a disassembled view of the electric device and FIG. 4 illustrates an assembled view of the electric device.

The electric device in accordance with the second embodiment simplifies or even entirely dispenses with entirely the noted assembly steps of the leading of cables 4 through cable feedthrough openings 11 in retaining cap 10 and the pushing of retaining cap 10 over the length of cables 4. To this end, the electric device in accordance with the second embodiment includes a clamping device 3b of a different type than clamping device 3a of the electric device in accordance with the first embodiment.

Clamping device 3b is a two-part clamping device including a first clamping body 6c and a second clamping body 6d. First and second clamping bodies 6c and 6d are interconnectable with one another to form the assembled clamping device 3b. As such, clamping device 3b does not include a separate retaining cap or the like.

Figure 8:
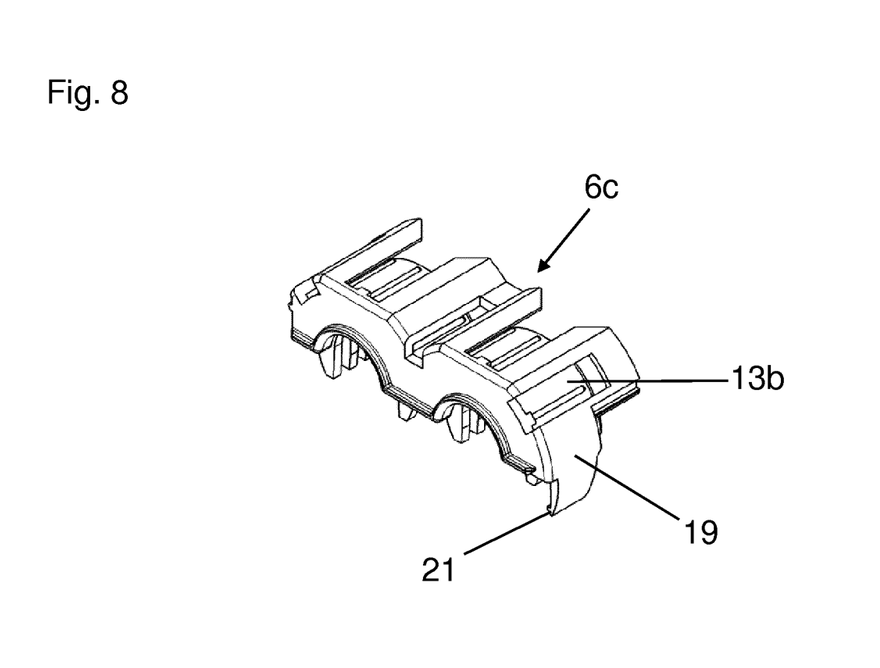
FIG. 8 illustrates a first clamping body of a clamping device of the electric device in accordance with the second embodiment.
Figure 9:
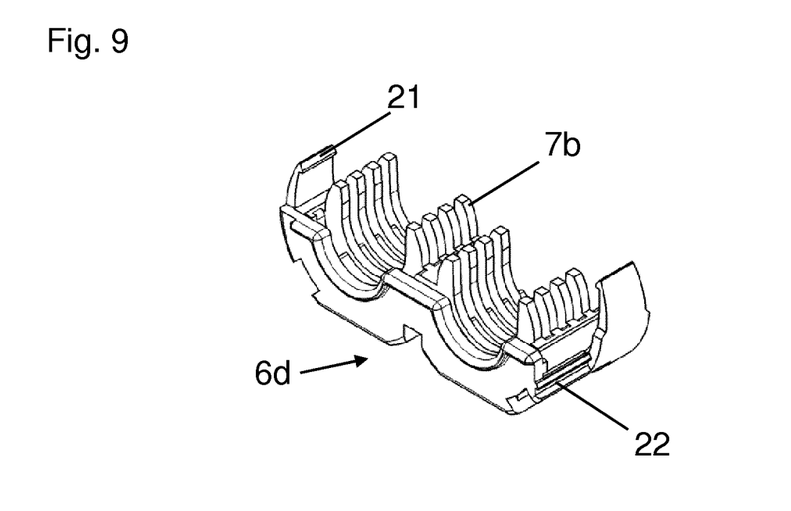
FIG. 9 illustrates a second clamping body of the clamping device of the electric device in accordance with the second embodiment.

FIGS. 8 and 9 respectively illustrate first clamping body 6c and second clamping body 6d as individual parts. As shown in FIGS. 8 and 9, clamping bodies 6c and 6d each include two semi-annular clamping portions similar to clamping bodies 6a and 6b. Clamping bodies 6c and 6d further include first and second sets of arch-shaped clamping ribs 7b, respectively, similar to clamping bodies 6a and 6b.

As is apparent from FIGS. 8 and 9, first and second clamping bodies 6c and 6d are designed in such a way that at the same time they are able to assume the function of a retaining cap.

The shape of first and second clamping bodies 6c and 6d is based on the principle that the described retaining cap 10 is divided lengthwise and each of the longitudinal halves of retaining cap 10 is connected to one of the described first and second clamping bodies 6a and 6b.

First and second clamping bodies 6c and 6d having such a modified design may likewise be manufactured in one piece. In addition, clamping bodies 6c and 6d, which are to be connected to one another, may likewise have a symmetrical shape so that they may be manufactured as cost-effective identical parts.

Detent elements in the area of clamping ribs 7b, such as detent portions 9 which form micro-teething, may be dispensed with in the design of first and second clamping bodies 6c and 6d. Instead, stable mechanical detent elements 21 and 22 are integrally formed on outer housing parts 19 of clamping bodies 6c and 6d, respectively.

As noted, FIG. 3 illustrates a disassembled view of the electric device according to the second embodiment. Under the assumption that cables 4 have not yet been inserted into their end position in cable inlet ports 2, the FIG. 3 illustration may at the same time depict the assembly step of attaching clamping device 3b to cables 4 and to cable inlet ports 2. In contrast to the first embodiment, clamping device 3b has a two-part, not a three-part, design, and is made up of only the two clamping bodies 6c and 6d.

For fastening, first and second clamping bodies 6c and 6d are positioned on both sides of cables 4 and then pressed together. Detent elements 21 and 22 hereby lock with one another at outer housing parts 19 of clamping bodies 6c and 6d and press clamping ribs 7b against cable sheathings 23. Clamping device 3b is fixed to cables 4 in this way. At the same time, by inserting clamping bodies 6c and 6d respectively into cable inlet ports 2, outer housing parts 19 of clamping device 3b are pushed over the outer surfaces 12 of cable inlet ports 2 until detent recesses 13b in outer housing parts 19 connect with locking tabs 14 on cable inlet ports 2. The assembled state illustrated in FIG. 4, with cables 4 fixed to housing 1, is achieved in this way.

Figure 10:
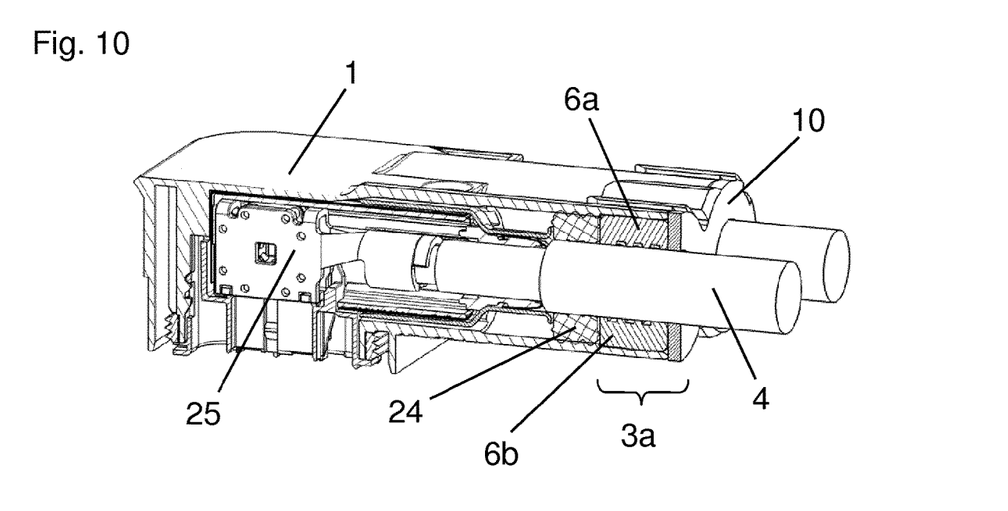
FIG. 10 illustrates a sectional view of the electric device in accordance with the first embodiment.
Figure 11:
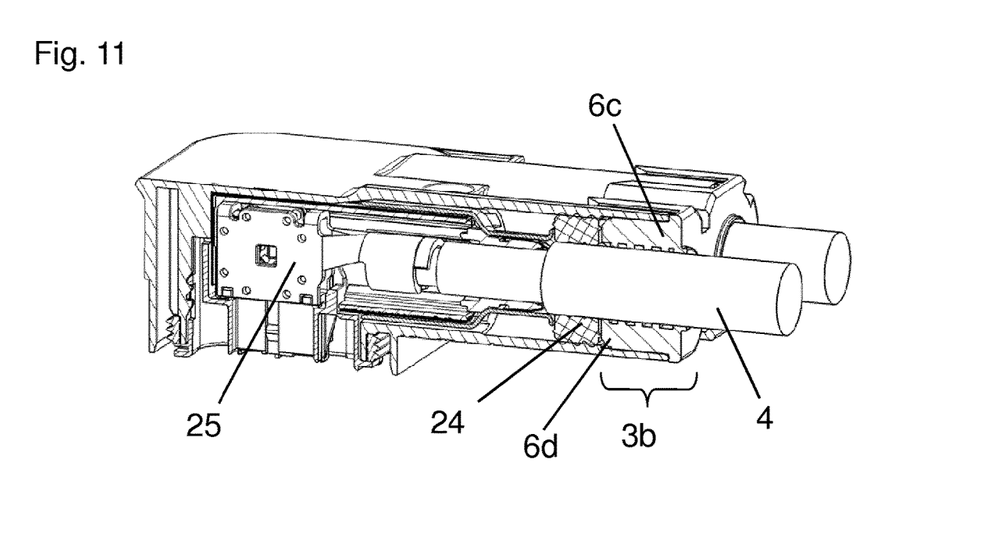
FIG. 11 illustrates a sectional view of the electric device in accordance with the second embodiment.

FIGS. 10 and 11 additionally illustrate the design of the first and second embodiments of the electric device in each case in a longitudinal sectional view. FIG. 10 shows the three-part design of clamping device 3a via first clamping body 6a, second clamping body 6b, and retaining cap 10. FIG. 10 further shows how clamping device 3a fixes cables 4 and establishes a form-fit connection to housing 1. FIG. 11 shows the two-part design of clamping device 3b via first clamping body 6c and second clamping body 6d. FIG. 11 further shows how first and second clamping bodies 6c and 6d fix cables 4 and also establish a form-fit connection to housing 1.

A rubber seal 24 which prevents the penetration of moisture from the cable side into housing 1 is directly behind each clamping device 3a and 3b. Also apparent in each of FIGS. 10 and 11 is a plug socket 25 of a high-voltage electrical plug-in connector, into which a blade connector may be inserted from the bottom side of housing 1. Further particulars concerning the design of this type of high-voltage plug-in connector may be found in DE 10 2009 016 157 A1 (corresponding to U.S. Publication No. 2012/0034817). As such, a detailed explanation may be dispensed with here.

LIST OF REFERENCE CHARACTERS

1 Housing
2 Cable inlet port or connection
3a, 3b Clamping device
4 Cable
5 Connecting web
6a, 6b, 6c, 6d Clamping body
7a, 7b Clamping ribs
8 Inlet opening
9 Engaging or Connecting means (Mechanical detent portions)
10 Retaining cap
11 Cable feedthrough openings
12 Outer surfaces
13a, 13b Detent recesses (first detent means)
14 Locking tabs (second detent means)
15 Contact ribs
16 (Semi-annular) clamping body portions
17 Gaps
18 Side walls
19 Outer housing parts
20 End-face wall
21, 22 Mechanical detent elements
23 Cable sheathing
24 Rubber seal
25 Plug socket
26 Recess
R Rotation axis
S Axis of symmetry While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric device comprising:
a housing having a port through which a cable is led; and
a clamp having a first clamping body and a second clamping body that are inter-connectable to one another, the first clamping body having a first set of arch-shaped clamping ribs situated in parallel to one another and separated by a first set of gaps and the second clamping body having a second set of arch-shaped clamping ribs situated in parallel to one another and separated by a second set of gaps, the clamping ribs of the first clamping body interlock with the clamping ribs of the second clamping body with the clamping ribs of the first clamping body fitting into the gaps of the second clamping body and the clamping ribs of the second clamping body fitting into the gaps of the first clamping body when the clamping bodies are interconnected to one another, the clamping bodies being interconnected to one another causing the clamping ribs to interlock with one another around the cable and press against the cable to thereby fix the clamp to the cable, wherein the clamp is situated at an opening of the port with the clamping bodies being within the port and the clamp is fastened to the housing.

2. The electric device of claim 1 wherein:
the clamping bodies further include a plurality of detent recesses;
the housing further includes a plurality of locking tabs on an outer surface of the port; and
the locking tabs of the housing engage the detent recesses of the clamping bodies when the clamp is situated at the opening of the port to fasten the clamp to the housing.

3. The electric device of claim 1 wherein:
the clamp further includes a retaining cap, the retaining cap enclosing the clamping bodies within the port.

4. The electric device of claim 3 wherein:
the retaining cap includes a plurality of detent recesses;
the housing further includes a plurality of locking tabs on an outer surface of the port; and the locking tabs of the housing engage the detent recesses of the clamping bodies when the clamp is situated at the opening of the port to fasten the clamp to the housing.

5. The electric device of claim 3 wherein:
the retaining cap has a cable feedthrough opening.

6. The electric device of claim 1 wherein:
the first clamping body is a unitary structure having a partial-annular clamping body portion;
the second clamping body is a unitary structure having a partial-annular clamping body portion; and
the clamping body portion of the first clamping body and the clamping body portion of the second clamping body complement one another to form a full-annular clamping body portion when the clamping bodies are interconnected to one another.

7. The electric device of claim 6 wherein:
the clamping body portion of the first clamping body is a semi-annular clamping body portion and the clamping body portion of the second clamping body is a semi-annular clamping body portion.

8. The electric device of claim 1 wherein:
the clamping bodies are identical parts.

9. The electric device of claim 1 wherein:
each clamping body has an axially symmetrical design.

10. The electric device of claim 1 wherein:
the cables are high-voltage electrical cables.

11. The electric device of claim 1 wherein:
the electric device forms an electrical connector.

12. An electric device comprising:
a housing having a plurality of mutually parallel ports through which cables are respectively led into an interior of the housing; and
a clamp having inter-connectable first and second clamping bodies, the first clamping body having a first set of arch-shaped clamping ribs situated in parallel to one another and separated by a first set of gaps and the second clamping body having a second set of arch-shaped clamping ribs situated in parallel to one another and separated by a second set of gaps, the clamping ribs of the first clamping body interlock with the clamping ribs of the second clamping body with the clamping ribs of the first clamping body fitting into the gaps of the second clamping body and the clamping ribs of the second clamping body fitting into the gaps of the first clamping body when the clamping bodies are interconnected to one another, the clamping bodies being interconnected to one another causing the clamping ribs to interlock with one another around the cables and press against the cable to thereby fix the clamp to the cables, wherein the clamp is situated at openings of the ports with the clamping bodies being within the ports and the clamp is fastened to the housing.

13. The electric device of claim 12 wherein:
the clamping bodies further include a plurality of detent recesses;
the housing further includes a plurality of locking tabs on outer surfaces of the ports; and
the locking tabs of the housing engage the detent recesses of the clamping bodies when the clamp is situated at the openings of the ports to fasten the clamp to the housing.

14. The electric device of claim 12 wherein:
the clamp further includes a retaining cap, the retaining cap enclosing the clamping bodies within the ports.

15. The electric device of claim 14 wherein:
the retaining cap includes a plurality of detent recesses;
the housing further includes a plurality of locking tabs on outer surfaces of the ports; and
the locking tabs of the housing engage the detent recesses of the clamping bodies when the clamp is situated at the openings of the ports to fasten the clamp to the housing.

16. The electric device of claim 14 wherein:
the retaining cap has cable feedthrough openings.

17. The electric device of claim 12 wherein:
the first clamping body is a unitary structure having partial-annular clamping body portions;
the second clamping body is a unitary structure having partial-annular clamping body portions; and
the clamping body portions of the first clamping body and the clamping body portions of the second clamping body complement one another to form full-annular clamping body portions when the clamping bodies are interconnected to one another.

18. The electric device of claim 17 wherein:
the clamping body portions of the first clamping body are semi-annular clamping body portions and the clamping body portions of the second clamping body are semi-annular clamping body portions.

19. The electric device of claim 12 wherein:
the clamping bodies are identical parts.

20. The electric device of claim 12 wherein:
each clamping body has an axially symmetrical design.

* * * * *